United States Patent [19]
Kuryu

[11] Patent Number: 5,638,756
[45] Date of Patent: Jun. 17, 1997

[54] ROPE TRACTION DEVICE

[75] Inventor: Shizuka Kuryu, Tokyo, Japan

[73] Assignee: Nihon Biso Co., Ltd., Tokyo, Japan

[21] Appl. No.: 562,419

[22] Filed: Nov. 24, 1995

Related U.S. Application Data

[62] Division of Ser. No. 268,340, Jun. 30, 1994, Pat. No. 5,515,790.

[30] Foreign Application Priority Data

Jul. 16, 1993 [JP] Japan ................ 5-198976

[51] Int. Cl.⁶ .................................................. B61D 1/00
[52] U.S. Cl. ...................... 104/197; 104/191; 254/333
[58] Field of Search ........................... 104/112, 114, 104/173.1, 178, 184, 191, 197, 189, 229, 230; 242/155 R; 474/94, 178, 190, 191, 192, 193, 166, 167, 174; 254/389, 414, 312, 359, 902, 333

[56] References Cited

U.S. PATENT DOCUMENTS

| | | | |
|---|---|---|---|
| 3,010,700 | 11/1961 | Petersen | 254/902 |
| 3,118,635 | 1/1964 | Landsem | 254/333 |
| 3,934,482 | 1/1976 | Byers | 254/902 |
| 4,193,311 | 3/1980 | Rinio et al. | 254/371 |
| 4,441,692 | 4/1984 | Kovaleski | 254/902 |
| 4,664,647 | 5/1987 | Olszewski et al. | 474/174 |

FOREIGN PATENT DOCUMENTS 885135   12/1979   U.S.S.R. ................ 254/902

*Primary Examiner*—Mark T. Le
*Attorney, Agent, or Firm*—Hedman, Gibson & Costigan, P.C.

[57] ABSTRACT

A rope traction device includes a sheave having an annular rope receiving groove and being driven and rotated with a traction rope received in the rope receiving groove to cause the traction rope to be wound on the sheave and the rope traction device thereby moves along the traction rope. The sheave includes a pair of side walls made of an elastic material and formed integrally with the sheave for forming the rope receiving groove. The interval between inner surfaces of the side walls in a rope holding portion is made smaller than the diameter of the traction rope by a predetermined value. The rope receiving groove may be formed in a U-shaped section, a V-shaped section or a section which is a combination of the U-shaped section and the V-shaped section.

2 Claims, 10 Drawing Sheets

5,638,756

ROPE TRACTION DEVICE

This is a divisional, of application Ser. No. 08/268,340, filed Jun. 30, 1994, now U.S. Pat. No. 5,515,790.

BACKGROUND OF THE INVENTION

This invention relates to a rope traction device and, more particularly, to an improvement in a rope traction device suitable for use in construction, loading and unloading and conveying machines including moving scaffolds, elevators and craces.

A rope traction device is a type of winding instrument used for construction, loading and unloading and conveying machines and is capable of moving up and down along a rope with the rope wound around its sheave by only one or few windings and without winding the rope around and feeding it from a drum.

An example of a prior art rope traction device used for moving up and down a moving scaffold for performing a work along an exterior wall surface of a building is shown in FIG. 9. This rope traction device includes a frame 1, a drive shaft 2 mounted on the frame 1, a motor (not shown) provided on the outer periphery of the drive shaft 2 through a bearing and a sheave 4 driven by this motor. The rope traction device further includes a traction mechanism 6 for holding a rope 5 wound about this sheave 4 by one winding for preventing the rope 5 from slipping off the sheave 4.

This traction mechanism 6 includes an L-shaped pivoting arm 8 provided in the vicinity of a point at which the rope 5 is disengaged from the sheave 4. A pair of rollers 9, 9 are rotatably mounted at one end of the pivoting arm 8 to press the rope 5 inwardly from a straight tightened state thereof. Another pair of rollers 10, 10 are rotatably mounted on a pivoting arm 11 which is pivotably mounted at the other end of the pivoting arm 8.

There is another type of prior art rope traction device disclosed in Japanese Patent Application Laid-open No. Hei 5-32395. In this rope traction device, as shown in FIG. 10, side plates 13, 13 which come into contact with the side surfaces of a rope 12 are made of leaf spring separately from a sheave main body 11. The two side plates 13, 13 are provided at sides of the sheave main body 11 in such a manner that the interval between the inner surfaces of the side plates is made smaller than the diameter of the rope by a predetermined value and the side plates 13, 13 are fixed to the sheave main body 11 by means of bolts 14 alternately or at opposite positions in the circumferential direction of the sheave.

According to this prior art rope traction device, since the side plates made of leaf springs are secured to the sides of the sheave by means of bolts alternately in the circumferential direction of the sheave, and the interval between the inner surfaces of the side plates is made smaller than the diameter of the rope, when the rope is received between the side plates, a portion of one of the side plates which is not secured to the sheave by the bolt but is located on the opposite side of a portion of the other side plate which is secured to the sheave by the bolt is flexed in the opposite direction to the portion of the side plate which is secured to the sheave by the bolt, so that the respective side plates are flexed undulatingly in the circumferential direction. As a result, a component force is produced due to the tension of the rope which component force is directed from the center of the rope to the portion of the side plate which is secured to sheave by the bolt and this increases frictional force acting between the rope and the side plates with the results that the pressing force excerted by the side plates to the rope also increases whereby transmission of power from the sheave to the rope is efficiently performed. In the case where the side plates are secured to the sides of the sheave by means of bolts at opposite positions in the circumferential direction, the rope received in the groove formed by the side plates is clamped and deformed so as to reduce its diameter in portions of the side plates which are secured to the sheave at opposite positions by means of the bolts whereas portions of the side plates which are not secured to the sheave are flexed outwardly on both sides and, as a result, a wedging force acts on the portions of the side plates which are secured to the sheave by the bolts due to the tension of the rope. As a result, frictional force acting between the rope and the side plates increases with resulting increase in the pressing force excerted by the sheave to the rope.

In the traction mechanism 6 of FIG. 9 in which the rope 5 is pressed against the sheave 4 by the pair of rollers 10, 10 mounted on the pivoting arm 11, bending moment is repeatedly applied to the rope 5 at points of contact with the V-shaped groove of the sheave 4 at two positions at which the rollers 10, 10 tend to slip sideways by force applied in transverse direction by twisting of the rope 5. For these reasons, wear occurs in the rope 5 and the life of the rope 5 thereby is shortened. Besides, change in the diameter of the rope 5 due to wear on the rope 5 and the groove of the sheave 4 causes change in the state of the pivoting arm 8 before pivoting with resulting change and instability in the pressing force obtained by the movement of the rollers 9, 9 by the rope 5, that is, the traction force.

In the rope traction device using the side plates 13 shown in FIG. 10, the flextion of the leaf springs applies stress concentrically at portions where the leaf springs are secured to the side plates, i.e., fixing points by the bolts 14. Therefore, the bolts 14 and the portions of the leaf springs about the openings for inserting the bolts 14 therethrough must have sufficient strength. The leaf springs constituting the side plates 13 must therefore have thickness corresponding to the strength of the portions about these openings where stress is concentrically applied and thus require a large thickness. This requirement for large thickness of the leaf springs, together with the requirement for mounting of the bolts 14, necessitates increase in the weight of the rope traction device as a whole with resulting difficulty in realizing a small and light-weight rope traction device. Moreover, the large thickness of the leaf springs increases the pressing force of the leaf springs against the rope 12 and this results in shortening of the life of the rope 12. Moreover, the large thickness of the leaf springs reduces the amount of flexion of the leaf springs which in turn reduces the rope holding force of the leaf springs.

In the prior art rope traction device of FIG. 10 in which the leaf springs are secured to the sheave main body 11 by means of the bolts 14, assembling and maintenance of the leaf springs are time-consuming and troublesome and, besides, manufacturing of the leaf springs and forming of the openings for the bolts in the side plates 13 and the sheave main body 11 also increases the manufacturing cost of the rope traction device.

Furthermore, since the side plates 13 are made of the leaf springs and it is extremely difficult to process the surface of the leaf spring by machining, it is extremely difficult to obtain a rope groove having a desired sectional shape such as a tapered groove by the side plates 13.

It is, therefore, an object of the invention to provide a rope traction device capable of prolonging the life of a wire rope with minimum wear caused thereon.

It is another object of the invention to provide a rope traction device capable of achieving a stable traction force.

It is another object of the invention to provide a small and light-weight rope traction device with a simplified structure.

It is another object of the invention to provide a rope traction device in which a rope receiving groove of any desired sectional shape can be designed.

SUMMARY OF THE INVENTION

For achieving the above described object of the invention, there is provided a rope traction device including a sheave having an annular rope receiving groove which sheave is driven and rotated with a traction rope received in the rope receiving groove to cause the traction rope to be wound on the sheave and said rope traction device thereby moving along the traction rope characterized in that said sheave of the rope traction device comprises a pair of side walls made of an elastic material and formed integrally with the sheave for forming the rope receiving groove, the interval between inner surfaces of the side wall in a rope holding portion being made smaller than the diameter of the traction rope by a predetermined value.

According to the invention, when the rope is pushed in the rope receiving groove of the sheave, the side walls elastically press the rope on both sides thereof to produce frictional force and thereby hold the rope, transmitting the power from the sheave to the rope. The rope therefore can be pressed uniformly along the entire periphery of the sheave. Rollers for pressing the rope as in the prior art rope traction device shown in FIG. 9 can therefore be obviated whereby the rope traction device can be made smaller and lighter. Further, no bending moment is applied to the rope and no slippage of the rope due to force acting in the transverse direction takes place so that wear of the rope can be minimized and the life of the rope can be prolonged.

As compared with the rope traction device disclosed in the above described Japanese Patent Application Laid-open No. Hei 5-32395 in which the side plates made of leaf springs are secured to the sheave by means of the bolts, the side walls forming the rope receiving groove in the device according to the invention are made of an elastic material and formed integrally with the sheave and no bolts are used for securing the side wall portions to the sheave and, hence, no stress is applied concentrically at the fixing points by the bolts as in the prior art device but stress is applied uniformly along the entire periphery of the side walls forming the rope receiving groove. Since this uniform stress is much smaller than the stress applied concentrically at the fixing points by the bolts as in the prior art device, the thickness of the side walls of the sheave in the device according to the invention can be made much smaller than the thickness of the leaf springs in the prior art device. This contributes, together with omission of the bolts, to a design of a smaller and lighter rope traction device. Further, since the rope is pressed uniformly along the entire periphery of the sheave, the life of the rope can be prolonged and a stable rope holding force can be maintained.

Further, as compared with the device disclosed in Japanese Patent Application Laid-open No. Hei 5-32395, no bolts are used for securing side wall portions to the sheave in the device according to the invention and, therefore, assembling and disassembling as well as maintenance of the sheave are easy. Moreover, since no processing of the sheave such as machining of bolt holes is obviated, the manufacturing process is simplified and the manufacturing cost is reduced.

Moreover, since the side walls forming the rope receiving groove is made integrally with the sheave, the side walls of the sheave can be formed simply by grinding of a disk-like steel and hence a rope receiving groove of any desired sectional shape such as one having a tapered surface can be easily formed.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENT

Figure 1:
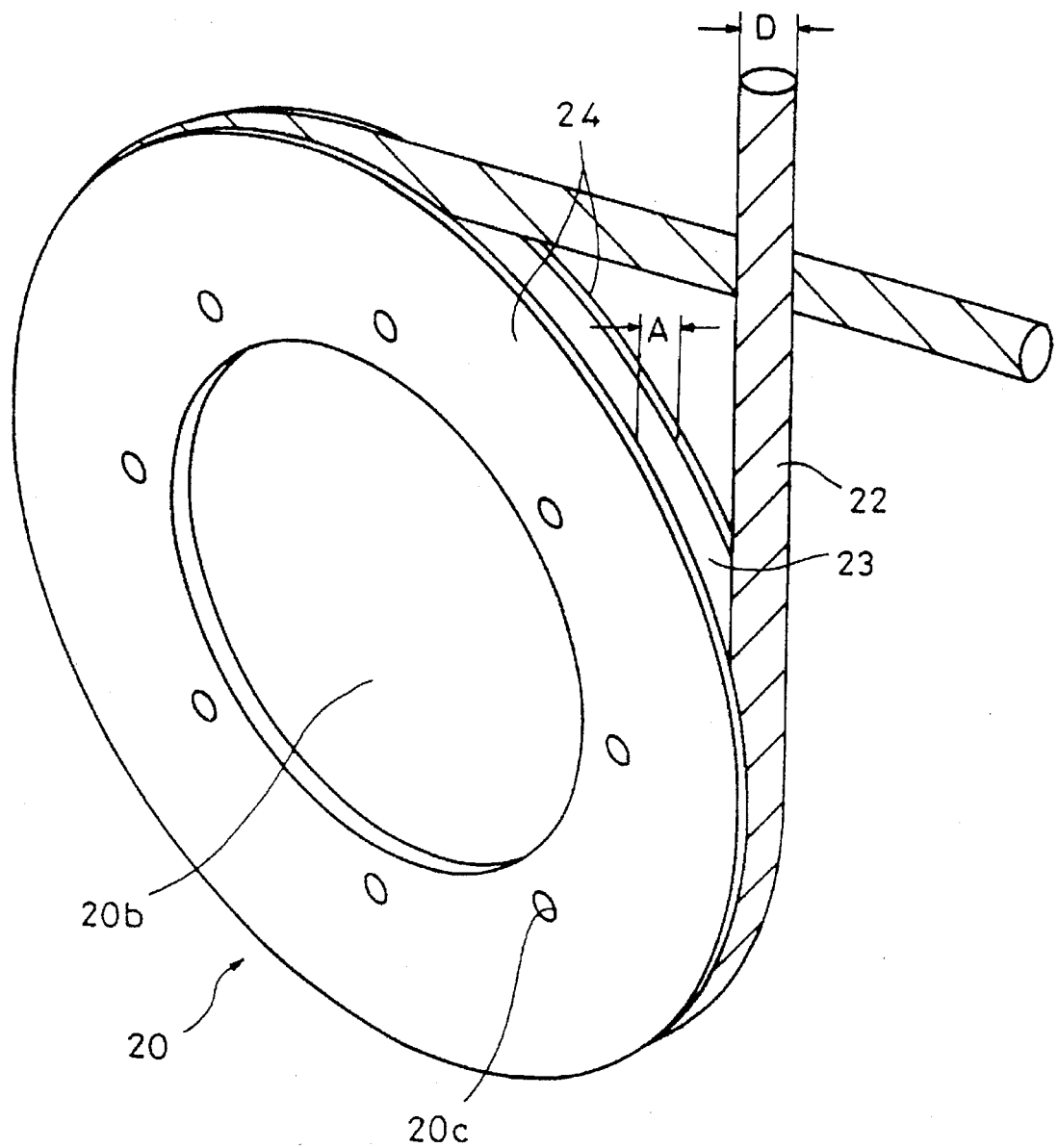
FIG. 1 is a perspective view showing a sheave used in an embodiment of the invention.
Figure 2:
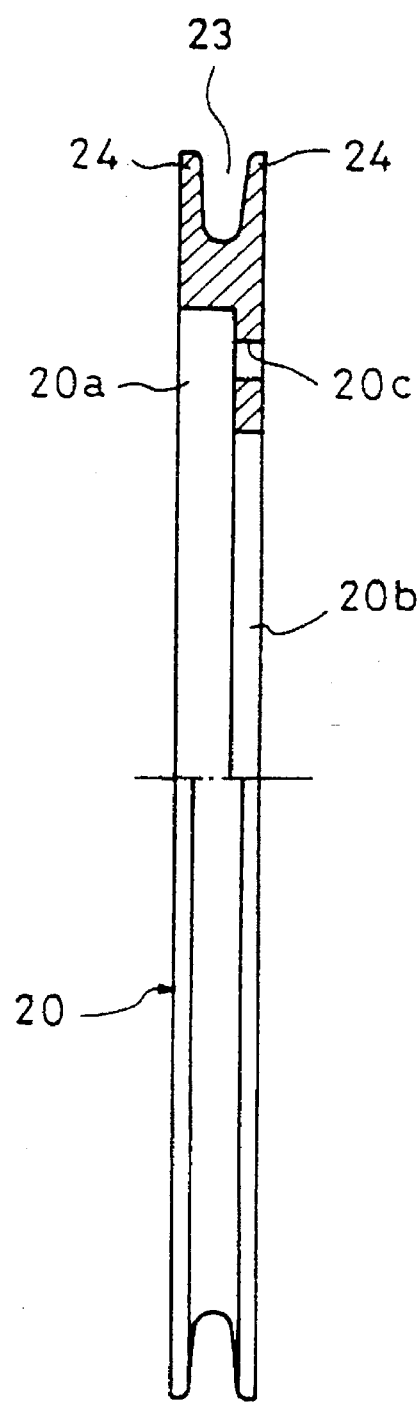
FIG. 2 is a side view of the sheave with its upper half portion being a view taken along lines B—B in FIG. 3.
Figure 3:
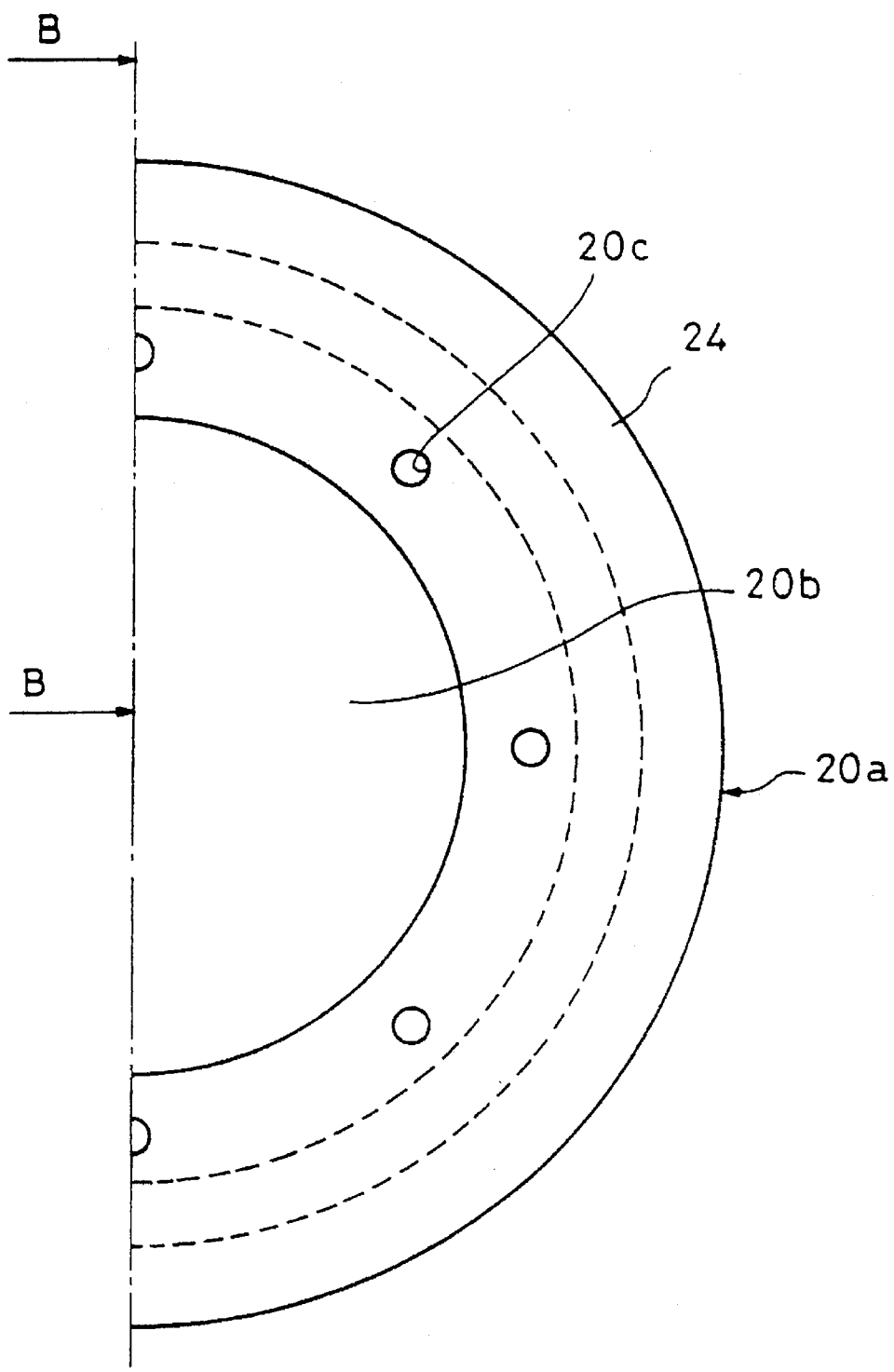
FIG. 3 is a front view of the sheave.

Referring to FIGS. 1 to 5, a rope traction device 15 has an annular sheave 20 provided in a frame 16. The sheave 20 has an annular rope receiving groove 23 for receiving a wire rope 22 formed along the peripheral surface of the sheave 20.

Figure 4:
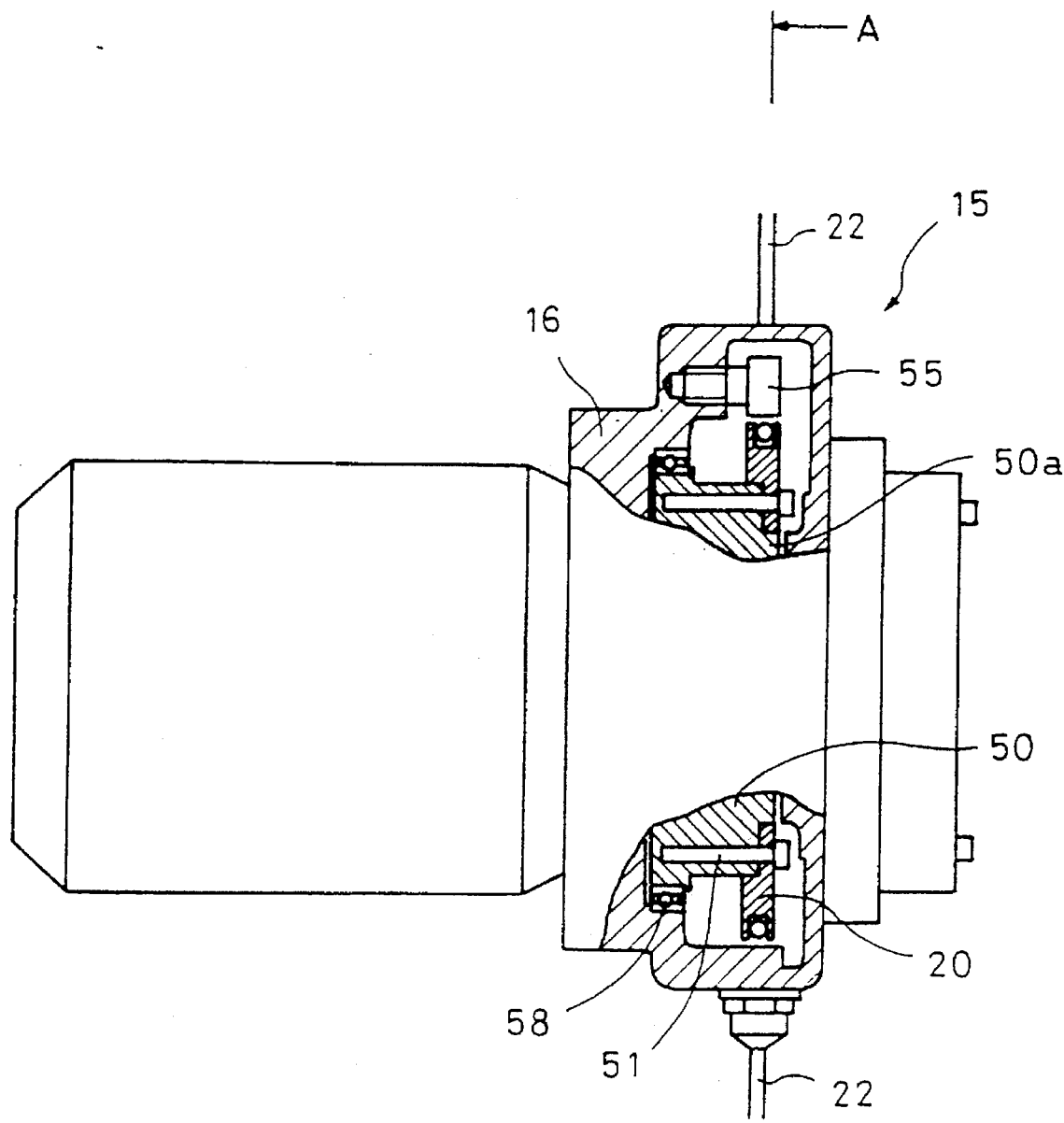
FIG. 4 is a view showing the rope traction device of this embodiment with a part thereof being shown in section.

This sheave 20 has an annular recess 20a (see FIG. 2) formed in the inner peripheral portion on one side of the sheave 20. A central opening 20b is formed contiguously to the annular recess 20b. As shown in FIG. 4, a stepped portion 50a formed in the front portion of a disk-like sheave holding member 50 is fitted in the annular recess 20a and the central opening 20b and the sheave 20 is secured to the sheave holding member 50 by means of bolts 51 inserted in bolt holes 20c formed in a circumferential direction in the inner peripheral side of the sheave 20. This sheave holding member 50 is rotatably supported on the frame 19 through a bearing 58.

Figure 5:
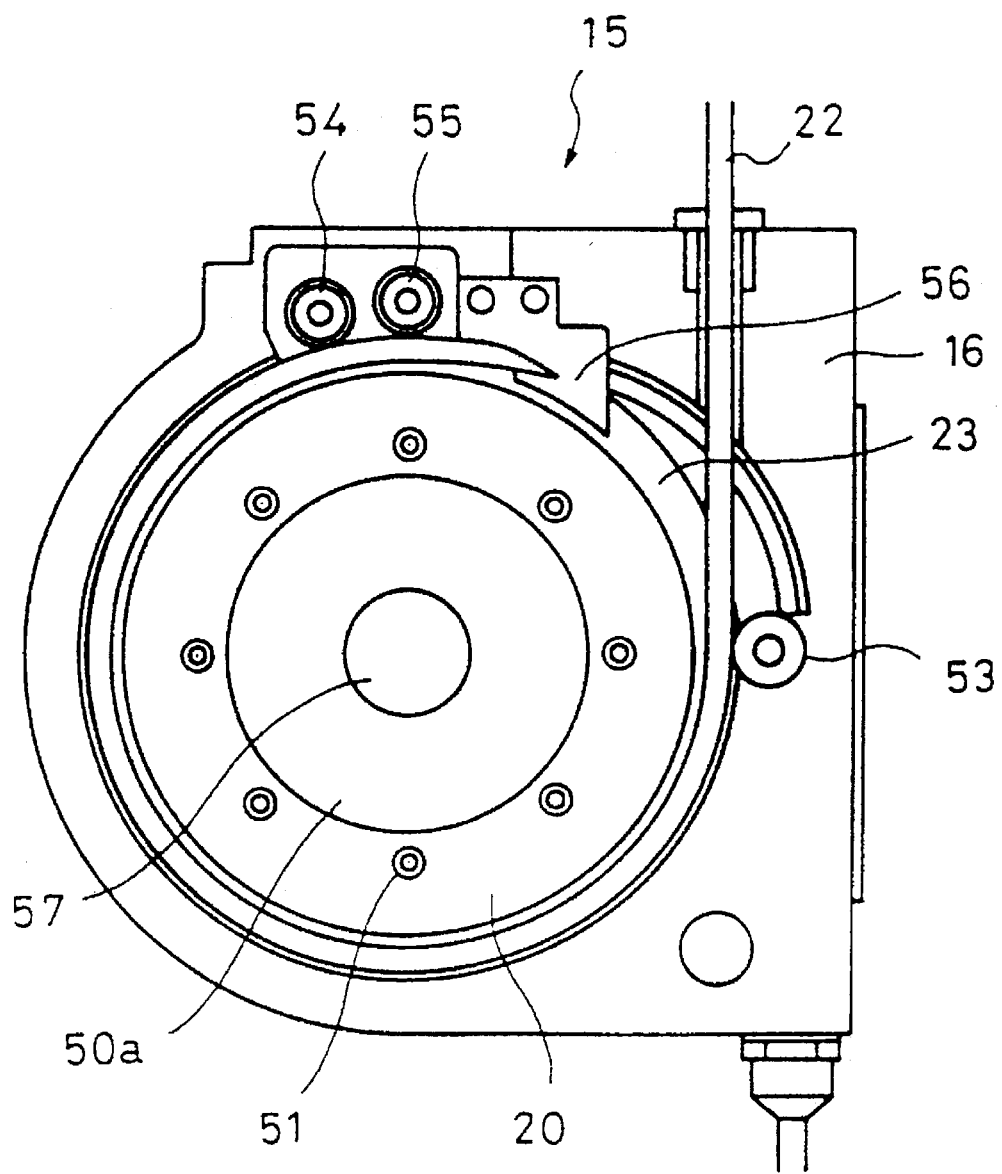
FIG. 5 is a view taken along lines A—A in FIG. 4.

For guiding a rope 22 accurately into the sheave 20, guide rollers 53, 54 and 55 are provided on the frame 16 as shown in FIG. 5. There is also provided a dust removing tongue 56 on the frame 16 for preventing intrusion of dust into the rope receiving groove.

The sheave 20 is driven by a drive mechanism (not shown) including a drive shaft 57 (FIG. 5). Since this drive mechanism is well known in the art, description thereof will be omitted.

As the sheave 20 is driven by the unillustrated drive mechanism, the rope 22 which is wound on the sheave 20 by about one winding is received in the rope receiving groove 23 by the guide rollers 53 through 55 mounted on the frame 16 and the rope 22 is pressed on the entire periphery thereof by side walls 24 which, together with the peripheral surface portion of the sheave 20 between the side walls 24, form the rope receiving groove 23 whereby the drive power is transmitted from the side walls 24 to the rope 22.

When a hanging load is applied to the rope 22, the rope 22 is engaged tightly in the rope receiving groove 23 due to tension produced by the hanging load and the drive power is transmitted from the sheave to the rope.

FIGS. 6A, 6B, 7A, 7B, 8A and 8B are partial sectional views of some examples of the shape of the rope receiving groove 23.

Figure 6A:
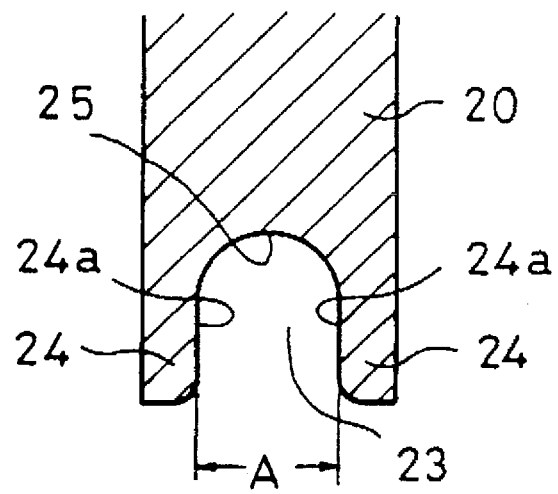
FIGS. 6A and 6B are partial sectional views of an example of the rope receiving groove formed in the sheave.

FIG. 6A shows an example in which the rope receiving groove 23 is formed in a substantially U-shaped section. The two side walls 24, 24 are formed integrally with the sheave 20 and made of an elastic material. e.g., SUS 420J2 stainless steel. Inner surfaces 24a, 24a of the side walls 24, 24 which come into contact with the rope 22 are formed in planes which are parallel to each other and are extending in the radial direction of the sheave 20. A bottom surface 25 of the rope receiving groove 23 is formed substantially in the shape of a semi-circle. The interval A between the inner surfaces 24a, 24a of the side walls 24, 24 is set at a value which is smaller than the diameter D of the rope 22 by a predetermined value.

Figure 6B:
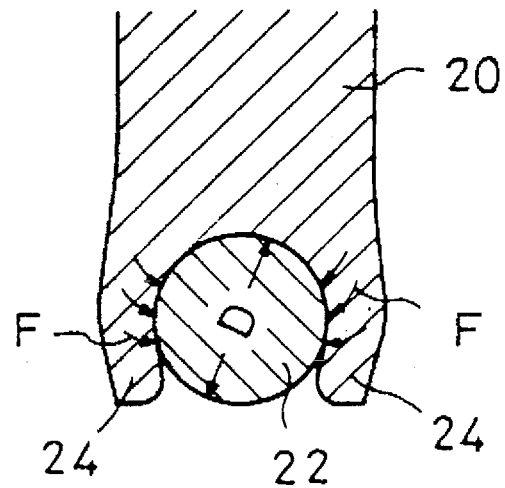

When the rope 22 is pushed in the rope receiving groove 23 by the guide roller 53 or due to the tension produced by hanging load, the side walls 24, 24 made of the elastic material are pushed apart as shown in FIG. 6B so that the rope 22 is brought into contact with the inner surfaces 24a, 24a of the side walls 24, 24 and the bottom surface 25 of the sheave 20. A frictional force F is produced uniformly between the rope 22 and the side walls 24, 24 which clamp the rope 22 on both sides thereof to hold the rope 22 and the drive power is transmitted from the sheave 20 to the rope 22.

In this embodiment, increased frictional force between the rope 22 can be obtained due to the contact of the rope 22 with the bottom surface 25 in addition to the inner surfaces 24a, 24a of the side walls 24, 24. Besides, since the rope 22 is not displaced in the radial direction in the rope receiving groove 23, the diameter of winding of the rope 22 is constant and, accordingly, a uniform running speed of the rope 22 can be achieved.

Figure 7A:
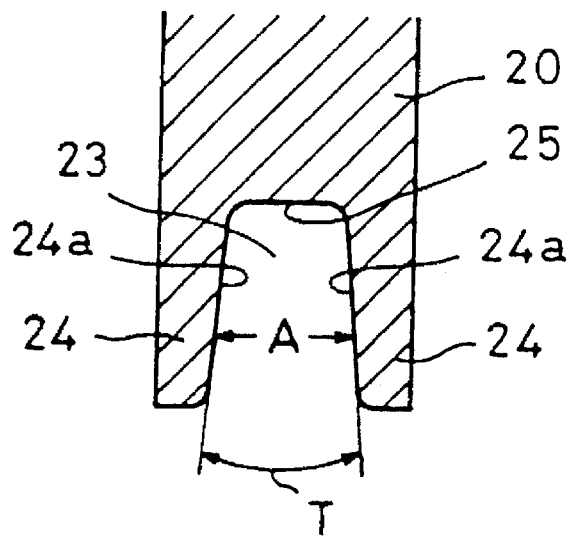
FIGS. 7A and 7B are partial sectional views of another example of the rope receiving groove.

FIG. 7A shows an example in which the rope receiving groove 23 is formed in a substantially V-shaped section. Inner surfaces 24a, 24a of side walls 24, 24 forming the rope receiving groove 23 are formed in inclined surfaces defining a radially outwardly enlarging taper T. A bottom surface 25 is formed in a substantially flat surface. The interval A between the inner surfaces 24a, 24a of the side walls 24, 24 at a rope holding position is set at a value which is smaller than the diameter D of the rope 22 by a predetermined value. Assuming that the depth of the rope receiving groove 23 is set at 15 mm, the interval between the inner surfaces 24a, 24a at the outer ends of the side walls 24, 24 at 7.8 mm and the thickness of the side wall 24 at its outer end at 2.5 mm, an optimum taper T is about 10 degrees.

Figure 7B:
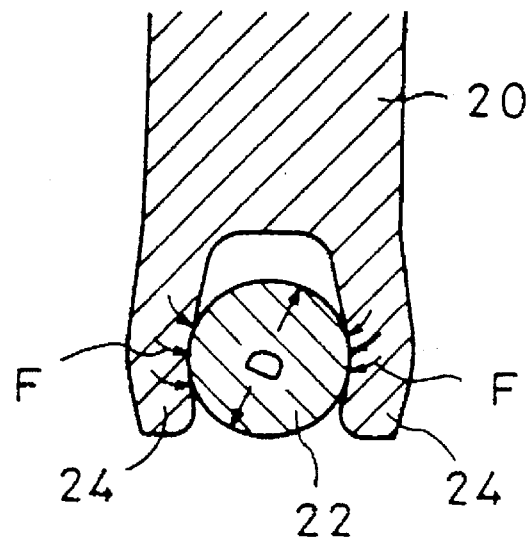

When the rope 22 is pushed in the rope receiving groove 23, the side walls 24, 24 are pushed apart as shown in FIG. 7B and the rope 22 is brought into contact with the inner surfaces 24a. 24a of the side walls 24, 24. A clamping force pressing the rope 22 uniformly on both sides thereof acts in the pushed apart side walls 24, 24 and, in addition, a wedging force is applied on the rope 22 due to the tapered inner surfaces 24a, 24a. A frictional force F which is a resultant complex force of these forces is applied to the rope 22 which is thereby held in the rope receiving groove 23.

Figure 8A:
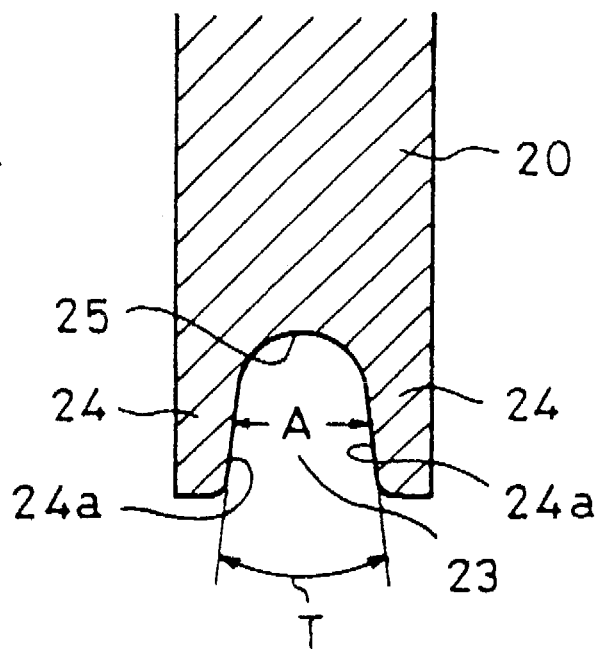
FIGS. 8A and 8B are partial sectional views of another example of the rope receiving groove.

FIG. 8A shows an example in which the rope receiving groove 23 is formed in a section which is a combination of the V-shaped section and the U-shaped section. Inner surfaces 24a, 24a of side walls 24, 24 which come into contact with the rope 22 are formed in inclined surfaces having a radially outwardly enlarging taper T and a bottom surface 25 is formed substantially in the shape of a semi-circle. The interval A between the inner surfaces 24a, 24a at a middle rope holding position is set at a value which is smaller than the diameter D of the rope 22 by a predetermined value.

Figure 8B:
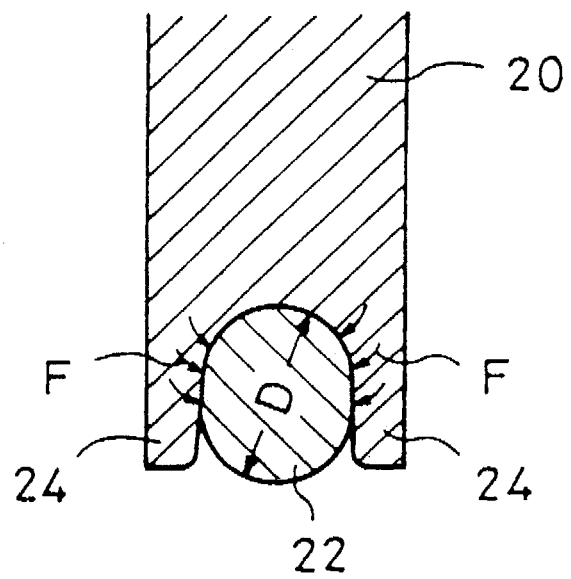

When the rope 22 is pushed in the rope receiving groove 23, the side walls 24, 24 are pushed apart as shown in FIG. 8B and the rope 22 is brought into contact with the inner surfaces 24a, 24a of the side walls 24, 24 and the bottom surface 25. A clamping force pressing the rope 22 on both sides thereof acts in the pushed apart side walls 24, 24 and a wedging force caused by the tapered inner surface 24a, 24a is produced. Thus, a frictional force F which is a resultant complex force of these forces is applied to the rope 22. The increased frictional force due to the contact of the rope 22 with the bottom 25 and the constant diameter of winding of the rope 22 enable the rope traction device to achieve a uniform running speed of the rope 22.

Figure 9:
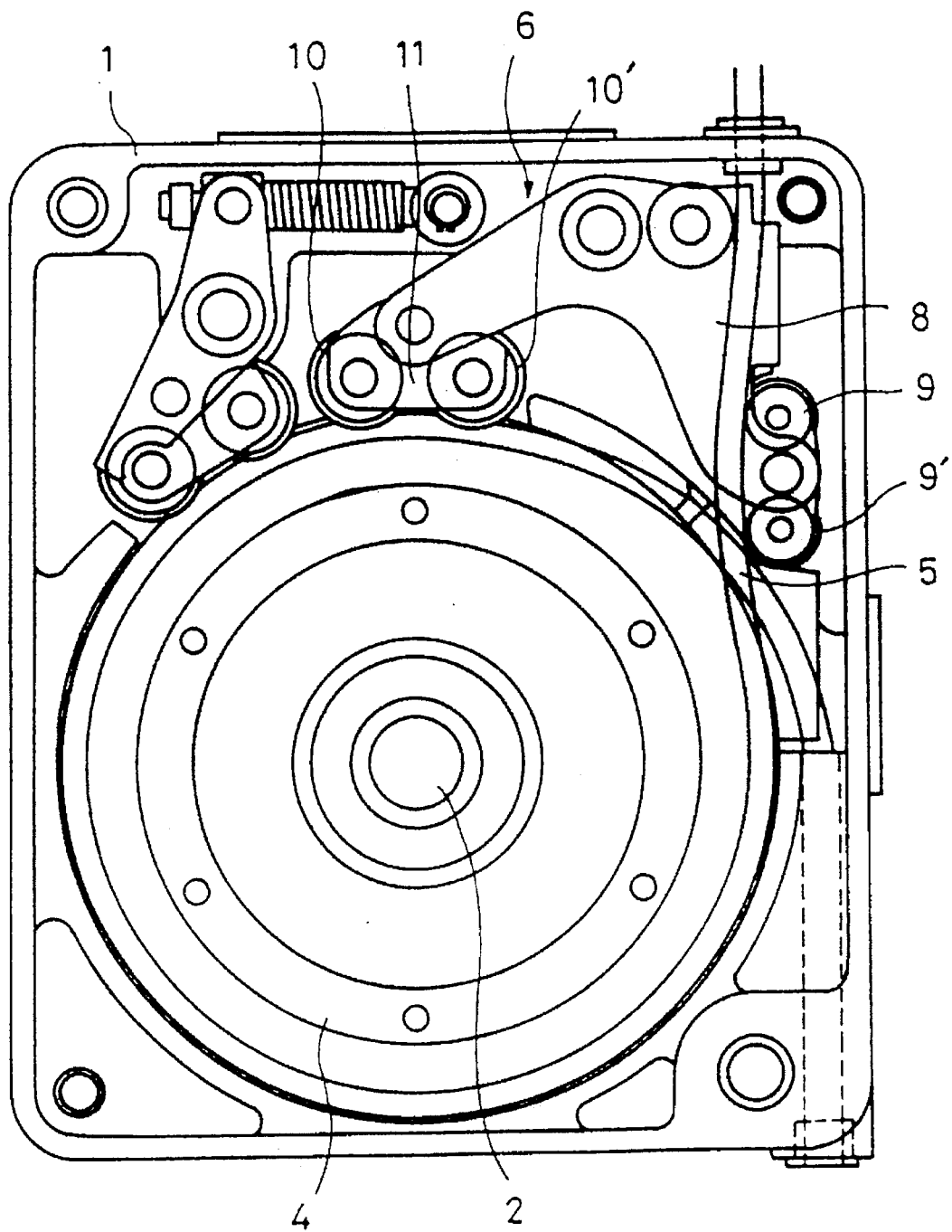
FIG. 9 is a sectional view showing a prior art rope traction device.
Figure 10:
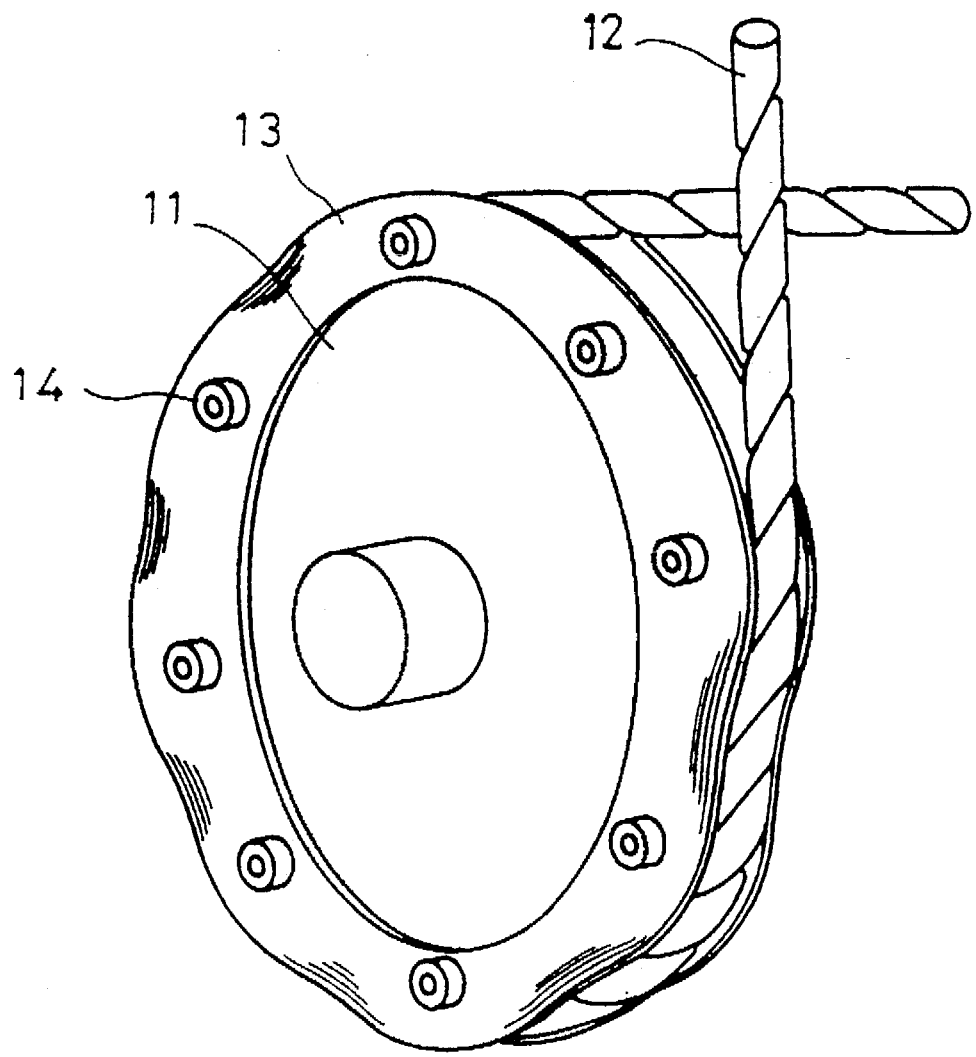
FIG. 10 is a perspective view showing another example of a prior art rope traction device.

In the examples of FIGS. 7A and 8A in which the rope receiving groove 23 is formed substantial iy in a V-shaped section, when the diameter of the rope 22 is reduced due to wear or pretension, the rope 22 can still push the side walls 24, 24 apart at a deeper position in the groove 23 than when the diameter is not reduced and, accordingly, a rope clamping force which is substantially equivalent to the case where the diameter of the rope 22 is not reduced can be produced. Therefore, in the case of the rope receiving groove of the V-shaped section, a constantly stable rope traction force can be obtained even when the diameter of the rope has changed whereby reliability of the device is enhanced. In comparison, in the prior art device shown in FIG. 9, even if the rope receiving groove is formed in a V-shaped section, change in the rope diameter brings about change in the amount of rotation of the pivoting arm with resulting change in the rope pressing force by the rollers so that a constantly stable traction force cannot be obtained.

What is claimed is:

1. A rope traction device including a sheave having an annular traction rope receiving groove, said sheave being driven and rotated with a traction rope made of a wire rope having a fixed diameter and a substantially circular cross-section which is received in said traction rope receiving groove to be wound on said sheave and thereby moving along said traction rope, said rope traction device being characterized in that said sheave of said rope traction device comprises a pair of side walls which come into contact with said rope and are formed integrally with said sheave to form said traction rope receiving groove, said traction rope receiving groove being formed in a substantially U-shaped section with the inner surfaces of said side walls which come into contact with said wire rope being formed with parallel surfaces that extend radially, said traction rope receiving groove having a bottom surface which is substantially in the shape of a semi-circle, the distance between the inner surfaces of said side walls in a rope holding position being made smaller than said diameter of said wire rope by a predetermined value when said wire rope is not received in said traction rope receiving groove and said side walls being made entirely of a material having such elasticity that, said side walls are elastically pushed apart to receive and clamp said rope at said rope holding position.

2. A rope traction device which comprises essentially of single sheave having an annular traction rope receiving groove to provide frictional engagement with a traction rope, said sheave being driven and rotated with a traction rope made of a wire rope having a fixed diameter and a substantially circular cross-section when said wire rope is received in said traction rope receiving groove to be wound on said sheave and said rope traction device thereby moving along said wire rope, said single sheave including a pair of side walls which come into contact with said wire rope and are formed integrally with said sheave to form said traction rope receiving groove, said traction rope receiving groove being formed in a substantially U-shaped section with the inner surfaces of said side walls which come into contact with said wire rope being formed with parallel surfaces that extend radially, said traction rope receiving groove having a bottom surface which is substantially in the shape of a semi-circle, the distance between the inner surfaces of said side walls in a rope holding position which is made smaller than said diameter of said traction rope by a predetermined value when said wire rope is not received in said traction rope receiving groove and said sheave being made entirely of a material having such elasticity that, said side walls are elastically pushed apart to receive and clamp said wire rope at said rope holding position.

\* \* \* \* \*